(12) United States Patent
Park

(10) Patent No.: US 12,062,813 B2
(45) Date of Patent: Aug. 13, 2024

(54) BATTERY PACK

(71) Applicant: Samsung SDI Co., Ltd., Yongin-si (KR)

(72) Inventor: Sanghun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 298 days.

(21) Appl. No.: 17/133,925

(22) Filed: Dec. 24, 2020

(65) Prior Publication Data

US 2021/0203043 A1 Jul. 1, 2021

(30) Foreign Application Priority Data

Dec. 31, 2019 (KR) .......................... 10-2019-0179794

(51) Int. Cl.
*H01M 10/00* (2006.01)
*H01M 50/109* (2021.01)
*H01M 50/204* (2021.01)
*H01M 50/216* (2021.01)
*H01M 50/536* (2021.01)
(Continued)

(52) U.S. Cl.
CPC ....... *H01M 50/536* (2021.01); *H01M 50/109* (2021.01); *H01M 50/204* (2021.01); *H01M 50/216* (2021.01); *H01M 50/543* (2021.01); *H01M 50/593* (2021.01)

(58) Field of Classification Search
CPC ............. H01M 50/536; H01M 50/109; H01M 50/216; H01M 50/643; H01M 50/213; H01M 50/531; H01M 50/55; H01M 50/591; H01M 50/593; H01M 50/181; H01M 50/559; H01M 50/153; H01M 50/543;
(Continued)

(56) References Cited

U.S. PATENT DOCUMENTS 8,119,281 B2 2/2012 Kim
8,920,949 B2 12/2014 Hashimoto et al.
(Continued)

FOREIGN PATENT DOCUMENTS

CN 103165845 A 6/2013
JP 1994-058796 B2 8/1994
(Continued)

OTHER PUBLICATIONS

Korean Office action dated Sep. 21, 2022 issued in corresponding KR Patent Application No. 10-2019-0179794, 5 pages.
(Continued)

*Primary Examiner* — Nicholas P D'Aniello
(74) *Attorney, Agent, or Firm* — Lewis Roca Rothgerber Christie LLP

(57) ABSTRACT

A battery pack includes: a battery cell including a first surface, a first electrode on the first surface, a second electrode on the first surface, a second surface opposing the first surface, and a lateral surface connecting the first surface and the second surface to each other; first and second leads above the first and second electrodes, the first and second leads being respectively connected to the first and second electrodes; an insulating adhesive layer between the first surface and the first lead; and an insulating cover layer on the first and second leads, the insulating cover layer including an opening through which portions of the first and second leads are exposed.

22 Claims, 4 Drawing Sheets

(51) Int. Cl.
*H01M 50/543* (2021.01)
*H01M 50/593* (2021.01)

(58) Field of Classification Search
CPC ............. H01M 50/103; H01M 10/643; H01M 10/0427
See application file for complete search history.

(56) References Cited

U.S. PATENT DOCUMENTS

| | | | |
|---|---|---|---|
| 2011/0129698 A1* | 6/2011 | Baek | H01M 50/121 |
| | | | 429/7 |
| 2013/0149563 A1 | 6/2013 | Lee et al. | |
| 2015/0044527 A1* | 2/2015 | Neudecker | H01M 50/569 |
| | | | 429/246 |
| 2019/0097190 A1 | 3/2019 | Seol et al. | |
| 2019/0237713 A1 | 8/2019 | Seol et al. | |
| 2019/0280267 A1 | 9/2019 | Bae et al. | |

FOREIGN PATENT DOCUMENTS

| | | |
|---|---|---|
| JP | 2018-174123 A | 11/2018 |
| KR | 10-2009-0042535 | 4/2009 |
| KR | 10-0982468 B1 | 9/2010 |
| KR | 10-2013-0142198 | 12/2013 |
| KR | 10-2017-0063134 A | 6/2017 |
| KR | 10-2017-0071137 | 6/2017 |
| KR | 10-2018-0111538 | 10/2018 |

OTHER PUBLICATIONS

EP Office action dated May 10, 2022 issued in corresponding EP Application No. 20217628.5, 3 pages.
European Search Report dated May 6, 2021 issued in Application No. 20217628.5, 5 pages.
Chinese Office Action dated Jan. 26, 2024, issued in corresponding Chinese Patent Application No. 202011626917.4 (15 pages, including 8 pages of English translation).

* cited by examiner

BATTERY PACK

CROSS-REFERENCE TO RELATED APPLICATION

This application claims priority to and the benefit of Korean Patent Application No. 10-2019-0179794, filed on Dec. 31, 2019, in the Korean Intellectual Property Office (KIPO), the entire disclosure of which is incorporated herein by reference.

BACKGROUND

1. Field

One or more embodiments relate to a battery pack.

2. Description of the Related Art

In general, secondary batteries refer to batteries that can be repeatedly charged and recharged unlike non-rechargeable primary batteries. Secondary batteries are used as energy sources of devices such as mobile devices, electric vehicles, hybrid vehicles, electric bicycles, or uninterruptible power supplies. Secondary batteries are individually used or secondary battery modules (packs) each including a plurality of secondary batteries connected as one unit are used according to the types of external devices using secondary batteries.

Unlike small mobile devices such as cellular phones each operable for a certain period of time using a single battery, devices such as electric vehicles or hybrid vehicles having long operation times and consuming large amounts of electricity may prefer battery modules each including a plurality of batteries to handle problems relating to power and capacity, and the output voltages or currents of battery modules may be increased by adjusting the number of batteries included in each battery module.

SUMMARY

Aspects of one or more embodiments are directed towards a battery pack which includes: a battery cell having a height less than the diameter of an electrode surface; and compressible conductors having a large height reduction when compressed for electrical connection with the battery cell. Thus, the battery pack may have a relatively low height and may be effectively used for slim devices.

Aspects of one or more embodiments are directed towards a battery pack having a simple electrical connection structure to form a charge-discharge path from first and second electrodes to first and second output positions, and thus the battery pack may have a compact structure.

Aspects of one or more embodiments are directed towards a battery pack having improved safety by preventing (e.g., fundamentally preventing) or substantially preventing a short circuit which may occur between first and second output positions through an unintended external conductor.

Additional aspects will be set forth in part in the description which follows and, in part, will be apparent from the description, or may be learned by practice of the presented embodiments of the disclosure.

According to one or more embodiments, a battery pack includes: a battery cell including a first surface, a first electrode on the first surface, a second electrode on the first surface, a second surface opposing the first surface, and a lateral surface connecting the first surface and the second surface to each other; first and second leads above the first and second electrodes, the first and second leads being respectively connected to the first and second electrodes; an insulating adhesive layer between the first surface and the first lead; and an insulating cover layer on the first and second leads, the insulating cover layer including an opening through which portions of the first and second leads are exposed.

For example, the first electrode may be in a center area of the first surface, and the second electrode may be in a peripheral area of the first surface, the peripheral area of the first surface surrounding the first electrode.

For example, the first and second leads may be electrically connected to the first and second electrodes with first and second compressible conductors therebetween.

For example, the first and second compressible conductors may include an anisotropic conductive adhesive.

For example, the first and second leads may be electrically connected to the first and second electrodes by thermal bonding.

For example, the first and second leads may be exposed in a downwardly shifted manner from a top surface of the insulating cover layer.

For example, the opening may include first and second openings through which the portions of the first and second leads may be respectively exposed.

For example, the first and second openings may be located at opposite peripheral positions of the insulating cover layer corresponding to a peripheral area of the first surface.

For example, the first and second leads may extend between the first and second electrodes and the first and second openings.

For example, the first lead may extend from a first end portion thereof located in a center area of the first surface to the first opening located in a peripheral area of the first surface, and the first lead may include a second end portion exposed through the first opening.

For example, the first and second leads may include: first extension portions extending in an arrangement direction of the first and second leads; and second extension portions extending in a direction crossing the arrangement direction of the first and second leads, wherein the first extension portions may intersect the second extension portions at positions at which the first and second leads are exposed through the first and second openings.

For example, the arrangement direction of the first and second leads may be a diameter direction of the first surface having a circular shape.

For example, the first lead may include a first end portion conductively coupled to the first electrode via a first compressible conductor in a center area of the first surface, and the first lead may include a second end portion insulatively coupled to the second electrode via the insulating adhesive layer in a peripheral area of the first surface.

For example, the first and second leads may be between the first surface and the insulating cover layer, and the insulating adhesive layer may be between the first surface and the first lead.

For example, the insulating adhesive layer may include a double-sided tape and a first insulating tape sequentially stacked on the first surface of the battery cell.

For example, the insulating cover layer may further include a second insulating tape, and the first lead may be adhesively fixed between the first and second insulating tapes.

For example, the second lead may be adhesively fixed between the second insulating tape and the first surface.

For example, the insulating adhesive layer may expose a center area of the first surface in which the first electrode is located, and the insulating adhesive layer may be provided along a peripheral area of the first surface, the peripheral area surrounding the first electrode.

For example, the insulating adhesive layer may include an open side through which a portion of the peripheral area of the first surface may be exposed.

For example, the open side of the insulating adhesive layer may be at a position corresponding to the second lead, the open side having a shape open in an arrangement direction of the first and second leads.

For example, connection members may be on the portions of the first and second leads which may be exposed through the opening of the insulating cover layer.

For example, the connection members may include a compressible conductor, a soldering material, or wiring.

For example, the compressible conductor may include an elastic contact body.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
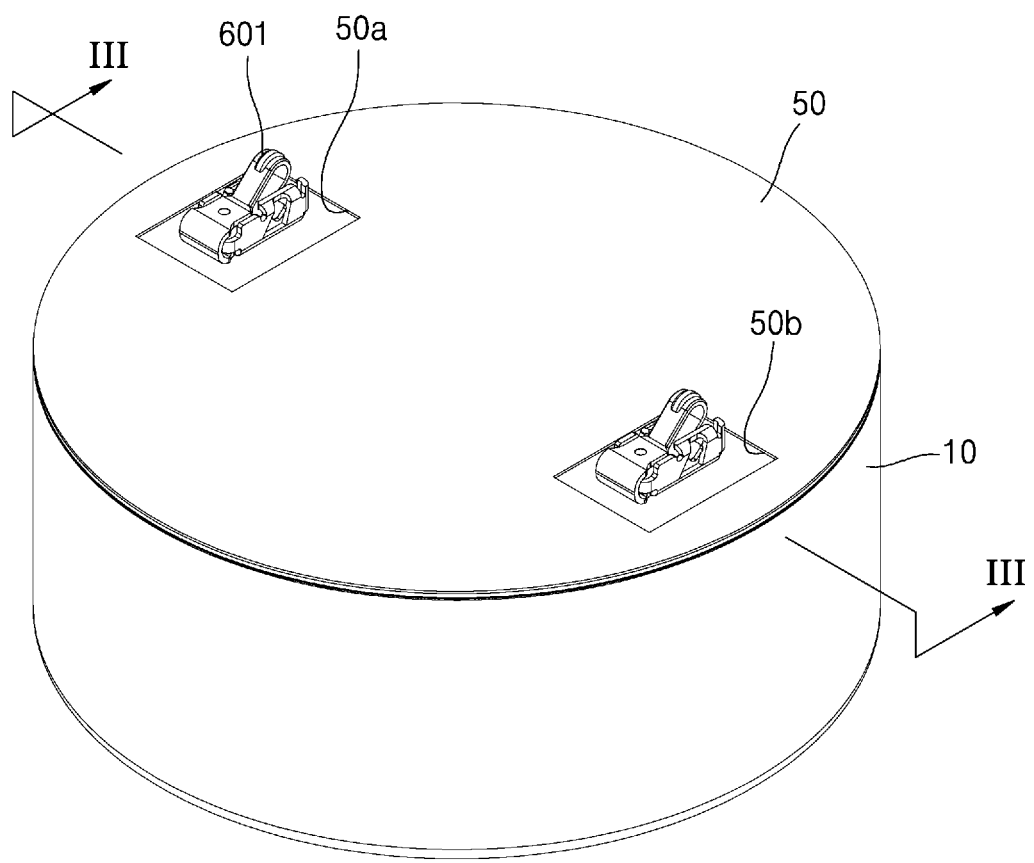
FIG. 1 is a perspective view illustrating a battery pack according to an embodiment.

Reference will now be made in more detail to embodiments, examples of which are illustrated in the accompanying drawings, and like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular example embodiments only and is not intended to limit the example embodiments described herein.

As used herein, the singular forms "a," "an," and "the" are intended to include the plural forms as well, unless the context clearly indicates otherwise.

It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

Further, the use of "may" when describing embodiments of the present disclosure refers to "one or more embodiments of the present disclosure".

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

In the drawings, the relative sizes of elements, layers, and regions may be exaggerated and/or simplified for clarity. Spatially relative terms, such as "beneath," "below," "lower," "above," "upper," "bottom," "top," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "substantially," "about," and similar terms are used as terms of approximation and not as terms of degree, and are intended to account for the inherent deviations in measured or calculated values that would be recognized by those of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, battery packs will now be described according to embodiments with reference to the accompanying drawings.

Figure 2:
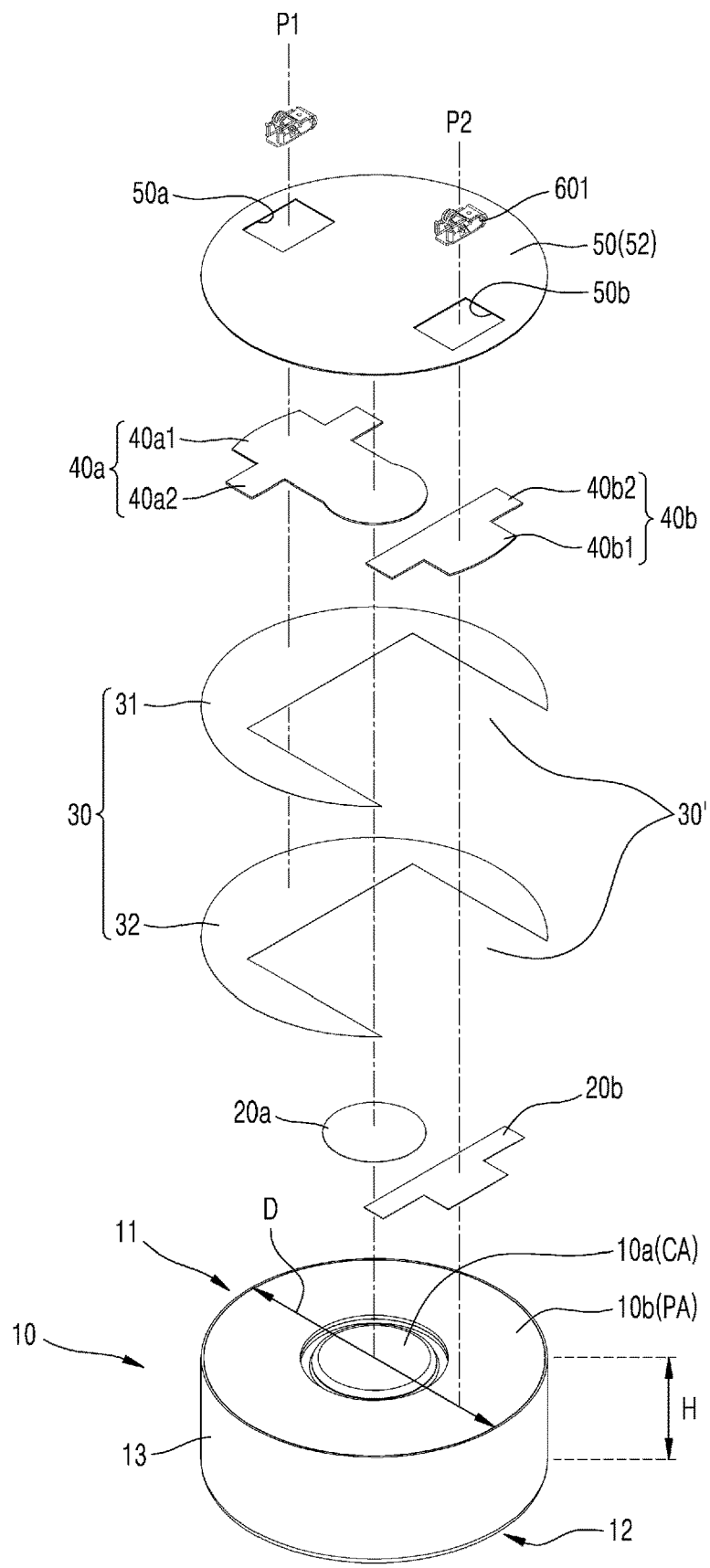
FIG. 2 is an exploded perspective view illustrating the battery pack shown in FIG. 1.
Figure 3:
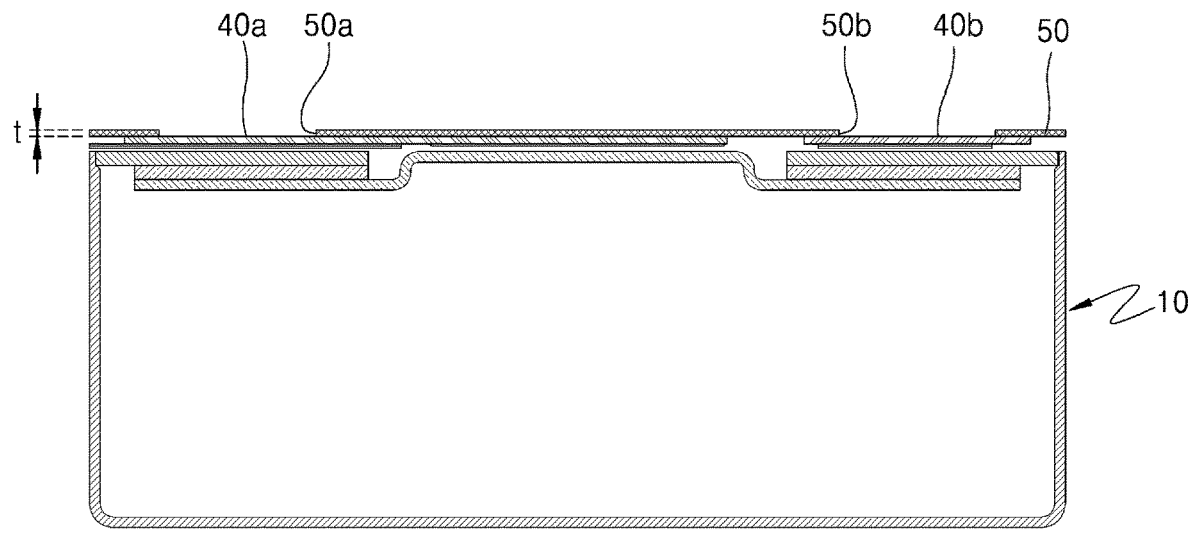
FIG. 3 is a cross-sectional view taken along the line III-III of FIG. 1.
Figure 4:
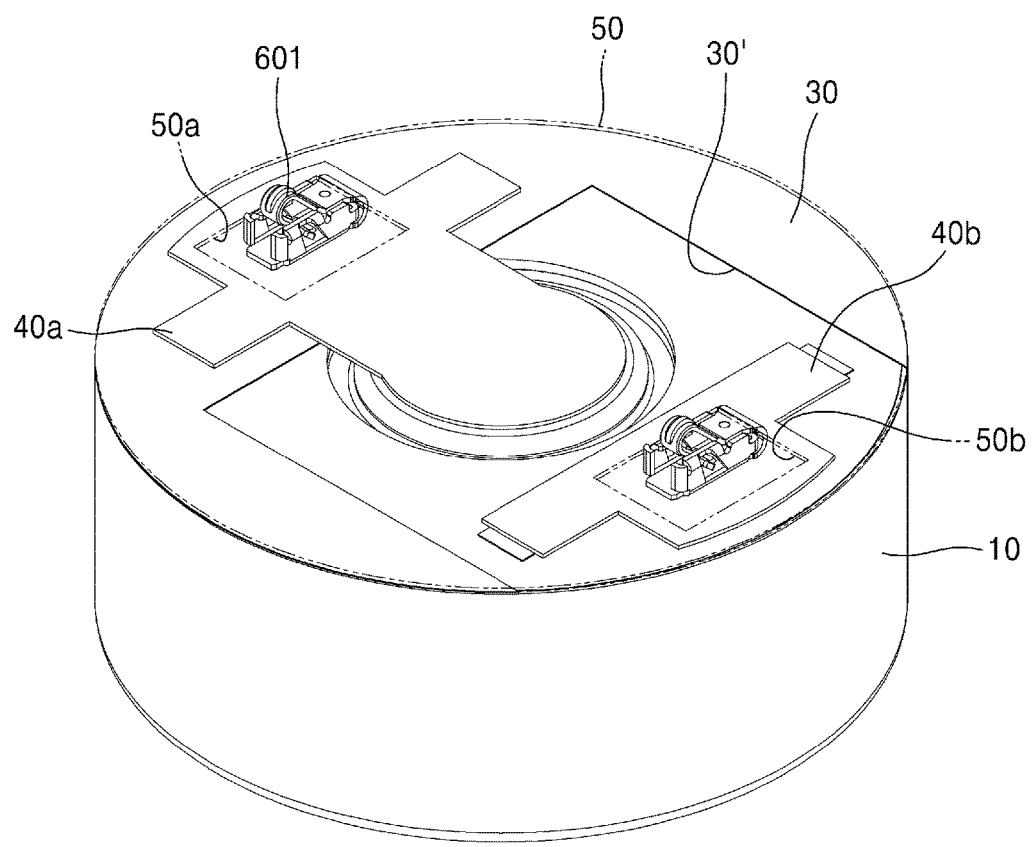
FIGS. 4 and 5 are perspective views illustrating battery packs to which different connection members are applied.
Figure 5:
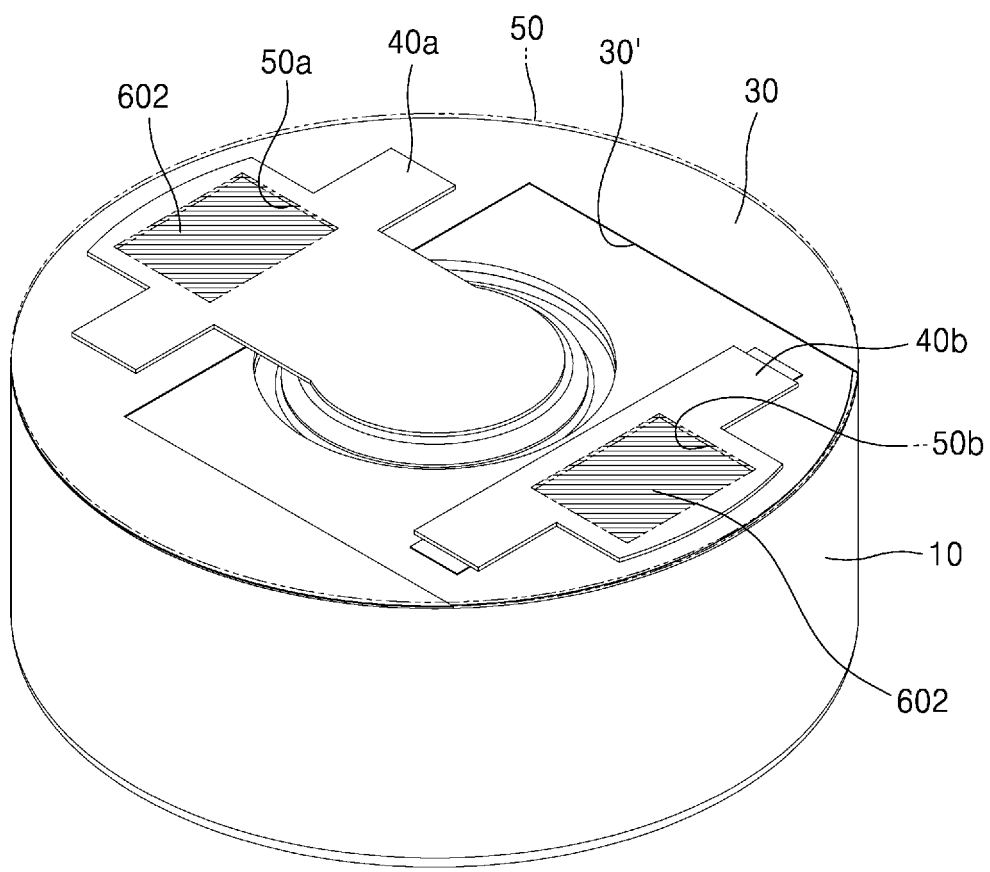

FIG. 1 is a perspective view illustrating a battery pack according to an embodiment. FIG. 2 is an exploded perspective view illustrating the battery pack shown in FIG. 1. FIG. 3 is a cross-sectional view taken along the line III-III of FIG. 1. FIGS. 4 and 5 are perspective views illustrating the battery pack according to other embodiments in which different connection members are applied to the battery pack.

Referring to FIGS. 1-3, according to an embodiment, the battery pack includes: a battery cell that includes a first surface 11 on which first and second electrodes 10a and 10b are formed, a second surface 12 which is opposite the first surface 11, and a lateral surface 13 which connects the first and second surfaces 11 and 12 to each other; first and second leads 40a and 40b that are arranged above the first and second electrodes 10a and 10b and respectively connected to the first and second electrodes 10a and 10b; an insulating adhesive layer 30 that is arranged between the first surface 11 and the first lead 40a; and an insulating cover layer 50 that is arranged above the first and second leads 40a and 40b and includes or defines openings including first and second openings 50a and 50b to expose the first and second leads 40a and 40b. In one or more embodiments, the first lead 40a is arranged between the first electrode 10a and the insulating cover layer 50, and the second lead 40b is arranged between the second electrode 10b and the insulating cover layer 50.

The battery cell 10 may include: the first and second surfaces 11 and 12 which are opposite each other; and the lateral surface 13 which connects the first and second surfaces 11 and 12 to each other. For example, according to an embodiment, the battery cell 10 may include first and second surfaces 11 and 12 which have a circular shape; and a lateral surface 13 which is rounded like a circumferential surface and connects the first and second surfaces 11 and 12 to each other. In one or more embodiments, the lateral surface 13 may be a curved surface with a curvature corresponding to the curvature of the circular shape of the first and second surfaces 11 and 12.

The insulating adhesive layer 30 and the insulating cover layer 50 which are arranged above the battery cell 10 may include round circumferential surfaces corresponding to the battery cell 10. In this case, the expression that the insulating adhesive layer 30 and the insulating cover layer 50 include round circumferential surfaces may refer to at least portions of the edges of the insulating adhesive layer 30 and the insulating cover layer 50 forming circumferential surfaces but may not refer to all of the edges of the insulating adhesive layer 30 and the insulating cover layer 50 forming circumferential surfaces.

The insulating adhesive layer 30 and the insulating cover layer 50 may include the round circumferential surfaces corresponding to the battery cell 10 and may be formed in a shape corresponding to the battery cell 10 in the circumferential direction of the battery cell 10 so as not to form an additional volume from the battery cell 10. That is, considering the limited space of a small device in which the battery pack will be used, the insulating adhesive layer 30 and the insulating cover layer 50 may be formed without a side protruding from the circumference of the battery cell 10 in a certain direction. In one or more embodiments, the diameter of the round circumferential surface of the insulating cover layer 50 may be equal to or less than the diameter D of the battery cell 10.

According to an embodiment, the battery cell 10 may be formed in a slim cylindrical shape such that the battery cell 10 may have a height H which is less than the diameter D of the first surface 11 having a circular shape. For example, that aspect ratio, that is, the ratio of the height H and the diameter D of the battery cell 10 may range from about 5.4:12 to about 5.4:14.

The first and second electrodes 10a and 10b having opposite polarities may be formed on the first and second surfaces 11 and 12 of the battery cell 10. For example, the first electrode 10a may be formed in a center area CA of the first surface 11, and the second electrode 10b may be formed on the entirety of the second surface 12, the lateral surface 13, and may extend from the lateral surface 13 to a peripheral area PA of the first surface 11. In this case, the first and second electrodes 10a and 10b may be formed together on the first surface 11 at different positions such that the first and second electrodes 10a and 10b may be respectively formed in the center area CA and the peripheral area PA of the first surface 11, and may be separate from or spaced from each other for electrical insulation from each other. Throughout the present specification, the expression that the first and second electrodes 10a and 10b are formed together on the first surface 11 of the battery cell 10 may refer to the first and second electrodes 10a and 10b being respectively formed in the center area CA and the peripheral area PA of the first surface 11. For example, in an embodiment, the center area CA of the first surface 11 may refer to an area in which the first electrode 10a is formed, and the peripheral area PA of the first surface 11 may refer to an area surrounding or encircling the first electrode 10a. As described later, the first and second electrodes 10a and 10b of the battery cell 10 may be respectively and connected (e.g., electrically connected) to the first and second leads 40a and 40b arranged above the first surface 11 of the battery cell 10.

The first and second leads 40a and 40b arranged above the first surface 11 of the battery cell 10 may be conductively coupled to respective ones of the first and second electrodes 10a and 10b of the battery cell 10 through corresponding first and second compressible conductors 20a and 20b. For example, in an embodiment, the first and second compressible conductors 20a and 20b may include an anisotropic conductive adhesive such as an anisotropic conductive film (ACF).

For example, the anisotropic conductive adhesive provided as one form of the first compressible conductor 20a may be arranged between the first lead 40a and the first electrode 10a formed in the center area CA of the first surface 11, and may have a circular shape between the first electrode 10a and an end portion of the first lead 40a, that is, a circular shape similar to the shape of the first electrode 10a. When the first electrode 10a and the first lead 40a are pressed in mutually-facing directions, the first compressible conductor 20a may be compressed between the first electrode 10a and the first lead 40a, and thus conductive particles dispersed in an insulating base material of the anisotropic conductive adhesive may be connected to each other such that the anisotropic conductive adhesive may have conductivity for connecting (e.g., electrically connecting) the first electrode 10a and the first lead 40a to each other. For example, the first electrode 10a and the first lead 40a may be conductively coupled to each other by pressing the first lead 40a against the first electrode 10a formed in the center area CA of the first surface 11 with the first compressible conductor 20a therebetween.

Similarly, the anisotropic conductive adhesive provided as one form of the second compressible conductor 20b may be arranged between the second lead 40b and the second electrode 10b formed in the peripheral area PA of the first surface 11, and may be shaped like the second lead 40b to extend in two crossing directions between the second electrode 10b and the second lead 40b. As described later, the second lead 40b may include first and second extension portions 40b1 and 40b2 which extend in mutually-crossing directions, and the second compressible conductor 20b may have a shape similar to the shape of the second lead 40b.

When the second electrode 10b and the second lead 40b are pressed in mutually-facing directions, the second compressible conductor 20b may be compressed between the second electrode 10b and the second lead 40b, and thus conductive particles dispersed in the insulating base material of the anisotropic conductive adhesive may be connected to each other such that the anisotropic conductive adhesive may have conductivity for connecting (e.g., electrically connecting) the second electrode 10b and the second lead 40b to each other. For example, the second electrode 10b and the second lead 40b may be conductively coupled to each other by pressing the second lead 40b against the second electrode 10b formed in the peripheral area PA of the first surface 11 with the second compressible conductor 20b therebetween.

In an embodiment, the conductive coupling between the first electrode 10a and the first lead 40a, and the conductive coupling between the second electrode 10b and the second lead 40b may be achieved via the first and second compressible conductors 20*a* and 20*b* respectively, but the present disclosure is not limited thereto. That is, in one or more embodiments, the conductive coupling between the first electrode 10*a* and the first lead 40*a*, and the conductive coupling between the second electrode 10*b* and the second lead 40*b* may be achieved by thermal bonding such as welding. For example, the first and second leads 40*a* and 40*b* may be welded to the first and second electrodes 10*a* and 10*b* which are respectively formed in the center area CA and the peripheral area PA of the first surface 11 of the battery cell 10.

The first lead 40*a* may connect the first electrode 10*a* of the battery cell 10 to a first output position P1 and may form a charge-discharge path connected to the first electrode 10*a* of the battery cell 10. In an embodiment, the first output position P1 may refer to the position of the first opening 50*a* which is formed in the insulating cover layer 50 forming the uppermost portion of the battery pack. That is, a portion of the first lead 40*a* may be exposed through the first opening 50*a* formed in the insulating cover layer 50 and may function as an output terminal which forms an end of the charge-discharge path of the battery pack. Throughout the present specification, the first output position P1 may refer to a position at which an output terminal of the battery pack is located, and in an embodiment, the first output position P1 may refer to a position at which the portion of the first lead 40*a* functioning as an output terminal is exposed through the first opening 50*a* of the insulating cover layer 50.

The first lead 40*a* may extend from the center area CA of the first surface 11, in which the first electrode 10*a* of the battery cell 10 is formed, to the peripheral area PA of the first surface 11, above which the first opening 50*a* is formed in the insulating cover layer 50 arranged on the first surface 11. For example, an end portion of the first lead 40*a* may overlap the first electrode 10*a*, which is formed in the center area CA of the first surface 11, and another end portion of the first lead 40*a* may overlap the first opening 50*a* and the second electrode 10*b*, which is formed in the peripheral area PA of the first surface 11. In an embodiment, the first lead 40*a* may extend in a diameter (D) direction of the first surface 11 having a circular shape, from an end portion of the first lead 40 which is formed in the center area CA of the first surface 11, to the peripheral area PA of the first surface 11. That is, the first lead 40*a* may include the other end portion formed in the peripheral area PA of the first surface 11. Throughout the present specification, the expression that the end portion of the first lead 40*a* is formed in the center area CA of the first surface 11 or the other end portion of the first lead 40*a* is formed in the peripheral area PA of the first surface 11 may refer to when the center area CA and the peripheral area PA of the first surface 11 are projected onto an upper side, the end portions of the first lead 40*a* are respectively in the projections of the center area CA and the peripheral area PA. Similarly, the expression that the first opening 50*a* of the insulating cover layer 50 is formed in the peripheral area PA of the first surface 11 may refer to when the peripheral area PA of the first surface 11 is projected onto an upper side, the first opening 50*a* of the insulating cover layer 50 is in the projection of the peripheral area PA. Furthermore, in an embodiment, the length direction of the first lead 40*a* may be in the diameter (D) direction of the first surface 11 having a circular shape. In an embodiment, the length direction of the first lead 40*a* may correspond to the arrangement direction of the first and second leads 40*a* and 40*b*.

In the length direction of the first lead 40*a*, the first compressible conductor 20*a* may be arranged between the first lead 40*a* and the first electrode 10*a* in the center area CA of the first surface 11 in which the end portion of the first lead 40*a* is formed, and the insulating adhesive layer 30 may be arranged between the first lead 40*a* and the second electrode 10*b* in the peripheral area PA of the first surface 11 in which the other end portion of the first lead 40*a* is formed. Because the first lead 40*a* extends from the center area CA of the first surface 11, in which the first electrode 10*a* is formed, to the peripheral area PA (corresponding to the first output position P1) of the first surface 11, in which the second electrode 10*b* is formed, the first lead 40*a* may be conductively coupled to the first electrode 10*a* and may be insulatively coupled to or insulated from the second electrode 10*b*. That is, the first lead 40*a* may be conductively coupled to the first electrode 10*a* with the first compressible conductor 20*a* therebetween in the center area CA of the first surface 11 in which the end portion of the first lead 40*a* is formed, and may be insulatively coupled to or insulated from the second electrode 10*b* with the insulating adhesive layer 30 therebetween in the peripheral area PA of the first surface 11 in which the other end portion of the first lead 40*a* is formed.

The insulating adhesive layer 30 may couple the first lead 40*a*, which is placed above the first surface 11 of the battery cell 10, to the first surface 11 and may insulate the first lead 40*a* from the first surface 11 (for example, from the second electrode 10*b* formed on the first surface 11). For example, the insulating adhesive layer 30 may provide insulation between the first lead 40*a* and the second electrode 10*b* of the first surface 11 of the battery cell 10. In addition, the insulating cover layer 50 arranged on the first lead 40*a* may be coupled to the first surface 11 of the battery cell 10 together with the first lead 40*a* by the insulating adhesive layer 30. For example, the insulating adhesive layer 30 may couple the insulating cover layer 50 to the first surface 11 of the battery cell 10 along a portion of the insulating cover layer 50 exposed from the first lead 40*a*.

In an embodiment, the insulating adhesive layer 30 may be provided along the peripheral area PA of the first surface 11 to surround the center area CA of the first surface 11 on which the first electrode 10*a* is formed. For example, the insulating adhesive layer 30 exposes the center area CA of the first surface 11 on which the first electrode 10*a* is formed, such that the first electrode 10*a* and the first lead 40*a* provided on the upper and lower sides of the insulating adhesive layer 30 may be coupled to each other. For example, the insulating adhesive layer 30 may include or define an opening, space, or gap exposing the center area CA of the first surface 11 on which the first electrode 10*a* is formed such that the first electrode 10*a* and the first lead 40*a* respectively located at the upper and lower sides of the insulating adhesive layer 30 may be coupled to each other.

The insulating adhesive layer 30 may be formed in a rim shape along the peripheral area PA of the first surface 11 with an open side 30' to expose a portion of the peripheral area PA of the first surface 11. The second electrode 10*b* may be formed in the peripheral area PA of the first surface 11 which is exposed through the open side 30', and the second electrode 10*b* and the second lead 40*b* provided on the upper and lower sides of the insulating adhesive layer 30 may be conductively coupled to each other through the open side 30'. That is, in an embodiment, although the insulating adhesive layer 30 is formed in a rim shape along the peripheral area PA of the first surface 11, the insulating adhesive layer 30 may not be of a closed loop type completely surrounding or encircling the center area CA of the first surface 11 but may be of a type open to the outside through the open side 30'. In one or more embodiments, the insulating adhesive layer 30 may be a C shape, and in other embodiments, the insulating adhesive layer 30 may be a different shape such that the insulating adhesive layer 30 exposes a portion of the peripheral area PA of the first surface 11 and the center area CA of the first surface 11. In an embodiment, the open side 30' of the insulating adhesive layer 30 may be formed at a position corresponding to the second lead 40b, and may have an open shape in the arrangement direction of the first and second leads 40a and 40b. For example, the open side 30' may have a shape open in the arrangement direction of the first and second leads 40a and 40b. In an embodiment, the arrangement direction of the first and second leads 40a and 40b may correspond to the diameter (D) direction of the first surface 11 having a circular shape and the length direction of the first lead 40a.

The insulating adhesive layer 30 may not be arranged between the second lead 40b and the first surface 11 because of the open side 30' of the insulating adhesive layer 30, but may be arranged between the first lead 40a and the first surface 11 for insulation between the first lead 40a and the first surface 11. For example, in an embodiment, the first and second leads 40a and 40b may be arranged between the first surface 11 and the insulating cover layer 50, and the insulating adhesive layer 30 may be arranged between the first surface 11 and the first lead 40a.

In an embodiment, the insulating adhesive layer 30 may include a double-sided tape 32 and a first insulating tape 31 that are sequentially stacked above the first surface 11 of the battery cell 10. As described above, the insulating adhesive layer 30 may be formed in a ring shape along the peripheral area PA of the first surface 11 and may have the open side 30' at a side along the peripheral area PA. In addition, the double-sided tape 32 and the first insulating tape 31 of the insulating adhesive layer 30 may have a rim shape with the open side 30', and may correspond to each other with substantially the same shape. In one or more embodiments, the double-sided tape 32 and the first insulating tape 31 may be a C shape, and in other embodiments, the insulating adhesive layer 30 may be a different shape such that the double-sided tape 32 and the first insulating tape 31 expose a portion of the peripheral area PA of the first surface 11 and the center area CA of the first surface 11.

The double-sided tape 32 may have a function of coupling the entirety of the insulating adhesive layer 30 to the first surface 11 of the battery cell 10 through adhesive layers formed on both sides of the double-sided tape 32, and the second insulating tape 31 may electrically insulate the peripheral area PA (for example, the second electrode 10b formed in the peripheral area PA) of the first surface 11 and the first lead 40a from each other. In this case, the first insulating tape 31 may include an adhesive layer on one side (or upper side) thereof for fixing the position of the first lead 40a. For example, the first insulating tape 31 may include a polyimide tape. As described later, the first lead 40a may be arranged and fixed between the first insulating tape 31 and the insulating cover layer 50, which are provided on the upper and lower sides of the first lead 40a. In an embodiment, the insulating cover layer 50 may include a second insulating tape 52, and for example, the second insulating tape 52 may include a polyimide tape. The second insulating tape 52 may include an adhesive layer on one side (or lower surface) thereof. In this case, the first lead 40a arranged between the first and second insulating tapes 31 and 52 may be adhesively fixed in position owing to the adhesive layers respectively formed on the upper and lower sides of the first and second insulating tapes 31 and 52 which face the first lead 40a.

The second lead 40b may connect the second electrode 10b of the battery cell 10 to a second output position P2 and may form the charge-discharge path connected to the second electrode 10b of the battery cell 10. In an embodiment, the second output position P2 may refer to the position of the second opening 50b which is formed in the insulating cover layer 50 forming the uppermost portion of the battery pack. That is, a portion of the second lead 40b may be exposed through the second opening 50b formed in the insulating cover layer 50 and may function as an output terminal which forms an end of the charge-discharge path of the battery pack. The first and second leads 40a and 40b may function as a pair of output terminals forming ends of the charge-discharge path of the battery pack, and for example, the portions of the first and second leads 40a and 40b which are respectively exposed through the first and second openings 50a and 50b of the insulating cover layer 50 may function as a pair of output terminals.

Throughout the present specification, the second output position P2 may refer to a position at which an output terminal of the battery pack is located, and in an embodiment, the second output position P2 may refer to a position at which the portion of the second lead 40b functioning as an output terminal is exposed through the second opening 50b of the insulating cover layer 50.

The second lead 40b may be connected to the second electrode 10b formed in the peripheral area PA of the first surface 11. For example, the second lead 40b may be connected (e.g., electrically connected) to the second electrode 10b which is exposed through the open side 30' of the insulating adhesive layer 30. For example, the conductive coupling between the second lead 40b and the second electrode 10b may be achieved by the second compressible conductor 20b arranged therebetween. In an embodiment, the second lead 40b may be connected to the second electrode 10b formed in the peripheral area PA of the first surface 11, and a portion of the second lead 40b may be exposed through the second opening 50b formed in the peripheral area PA of the first surface 11. The second lead 40b may be arranged between the first surface 11 of the battery cell 10 and the insulating cover layer 50. In an embodiment, the insulating cover layer 50 may include the second insulating tape 52, and the second lead 40b may be adhesively fixed in position by the adhesive layer formed on one side of the second insulating tape 52.

The insulating cover layer 50 may be arranged on the first and second leads 40a and 40b. The first and second openings 50a and 50b may be formed in the insulating cover layer 50 to respectively expose the portions of the first and second leads 40a and 40b. The portions of the first and second leads 40a and 40b respectively exposed through the first and second openings 50a and 50b of the insulating cover layer 50 may function as a pair of output terminals forming the charge-discharge path of the battery pack, and may be connected to an external device such as an external load or an external charger through the first and second openings 50a and 50b.

In an embodiment, the portions of the first and second leads 40a and 40b which function as output terminals are respectively exposed through the first and second openings 50a and 50b of the insulating cover layer 50 which covers the first and second leads 40a and 40b, and thus a short circuit between the first and second leads 40a and 40b through an external conductor may be prevented (e.g., fundamentally prevented) or substantially prevented. For example, in an embodiment, the first and second leads 40a and 40b are provided in a downwardly shifted manner below the top surface of the insulating cover layer 50 forming the uppermost portion of the battery pack with a height difference corresponding to the thickness (t, refer to FIG. 3) of the insulating cover layer 50 or the depth of the first and second openings 50a and 50b, and thus even when an external conductor comes into contact with the top surface of the insulating cover layer 50, the first and second leads 40a and 40b provided in a downwardly shifted manner below the insulating cover layer 50 may not come into contact with the external conductor, thereby preventing or reducing the possibility of a short circuit between the first and second leads 40a and 40b through the external conductor.

The first opening 50a may expose a portion of the first lead 40a which extends from the first electrode 10a formed in the center area CA of the first surface 11 to the peripheral area PA of the first surface 11, and the second opening 50b may expose a portion of the second lead 40b connected to the second electrode 10b formed in the peripheral area PA of the first surface 11. In an embodiment, the first lead 40a may include: a first extension portion 40a1 which extends in the arrangement direction of the first and second leads 40a and 40b; and a second extension portion 40a2 which extends in a direction crossing the arrangement direction of the first and second leads 40a and 40b, and a position at which the first lead 40a is exposed through the first opening 50a may be an intersection between the first and second extension portions 40a1 and 40a2. That is, the first and second extension portions 40a1 and 40a2 of the first lead 40a may intersect each other at the position at which the first lead 40a is exposed through the first opening 50a, and may extend across each other in directions perpendicular to each other. Similarly, the second lead 40b may include: a first extension portion 40b1 which extends in the arrangement direction of the first and second leads 40a and 40b; and a second extension portion 40b2 which extends in a direction crossing the arrangement direction of the first and second leads 40a and 40b, and a position at which the second lead 40b is exposed through the second opening 50b may be an intersection between the first and second extension portions 40b1 and 40b2. That is, the first and second extension portions 40b1 and 40b2 of the second lead 40b may intersect each other at the position at which the first lead 40a is exposed through the first opening 50a, and may extend across each other in directions perpendicular to each other.

The first and second extension portions 40a1, 40a2, 40b1, and 40b2 of the first and second leads 40a and 40b are to secure a margin for the tolerance of the first and second openings 50a and 50b, and thus even when there are some variations in the sizes of the first and second openings 50a and 50b, the first and second leads 40a and 40b may be properly exposed through the first and second openings 50a and 50b such that the surfaces of the output terminals exposed through the first and second openings 50a and 50b may be flat. In addition, because the end portions of the first and second leads 40a and 40b are respectively exposed through the first and second openings 50a and 50b, the surfaces of the output terminals may be provided in a downwardly shifted manner to prevent or substantially prevent an unstable or unintended electrical connection with an external device which may cause a short circuit between the first and second leads 40a and 40b.

The first and second openings 50a and 50b may be formed at peripheral positions (corresponding to the first and second output positions P1 and P2) of the insulating cover layer 50 which correspond to the peripheral area PA of the first surface 11 of the battery cell 10. In other words, the first and second openings 50a and 50b may be formed at peripheral positions of the insulating cover layer 50 corresponding to a projection of the peripheral area PA of the first surface 11 of the battery cell 10 onto the insulating cover layer 50. For example, the first and second openings 50a and 50b may be formed at opposite peripheral positions (corresponding to the first and second output positions P1 and P2) in the arrangement direction of the first and second leads 40a and 40b. Here, the arrangement direction of the first and second leads 40a and 40b may correspond to the diameter (D) direction of the first surface 11 having a circular shape. Because the first and second openings 50a and 50b are formed at the opposite positions (corresponding to the first and second output positions P1 and P2) spaced from each other in the diameter (D) direction of the first surface 11, the portions of the first and second leads 40a and 40b respectively exposed through the first and second openings 50a and 50b, that is, the pair of output terminals of the battery pack, may be provided at a distance from each other for ease of electrical connection with an external device.

FIGS. 4 and 5 are perspective views illustrating the battery pack according to other embodiment in which different connection members are applied to the battery pack.

Referring to FIGS. 4 and 5, connection members 601 or 602 may be provided on the portions of the first and second leads 40a and 40b exposed through the first and second openings 50a and 50b. For example, the connection members 601 or 602 may be provided on the first and second leads 40a and 40b exposed through the first and second openings 50a and 50b. In various embodiments, the connection members 601 or 602 may include third compressible conductors (refer to FIG. 4), a soldering material (refer to FIG. 5), or wiring. For example, the connection members 601 or 602 may form the charge-discharge path of the battery pack by connecting the output terminals (for example, the portions of the first and second leads 40a and 40b exposed through the first and second openings 50a and 50b) to an external device (for example, an external load or an external charger).

In the embodiment shown in FIG. 4, the third compressible conductors may be provided on the output terminals (for example, the portions of the first and second leads 40a and 40b exposed through the first and second openings 50a and 50b) of the battery pack as examples of the connection members 601. In this case, the third compressible conductors provided as examples of the connection members 601 may include elastic contact bodies such as contact springs through which the output terminals (for example, the portions of the first and second leads 40a and 40b exposed through the first and second openings 50a and 50b) of the battery pack are connected (e.g., electrically connected) to an external device.

In the embodiment shown in FIG. 5, the soldering material may be provided on the output terminals (for example, the portions of the first and second leads 40a and 40b exposed through the first and second openings 50a and 50b) of the battery pack as an example of the connection members 602. In this case, the soldering material provided as an example of the connection members 602 may couple wires extending from an external device to the output terminals (for example, the portions of the first and second leads 40a and 40b exposed through the first and second openings 50a and 50b) of the battery pack. For example, in the embodiment shown in FIG. 5, the soldering material, which is an example of the connection members 602, may be applied to the output terminals (for example, the portions of the first and second leads 40a and 40b exposed through the first and second openings 50a and 50b) of the battery pack such that the soldering material may have a uniform or substantially uniform thickness, or in another example, the soldering material may be formed on the output terminals of the battery pack whiling being soldered to terminals or extension wires of an external device.

In one or more embodiments, the flexible wires provided as examples of the connection members 601 or 602 may be coupled to the output terminals (for example, the portions of the first and second leads 40a and 40b exposed through the first and second openings 50a and 50b) of the battery pack, and may extend to an external device at which the flexible wires may be soldered to terminals of the external device.

As described above, according to the one or more of the embodiments, the battery cell 10 having a height less than the diameter of an electrode surface is used in the battery pack together with the first and second compressible conductors 20a and 20b having a large height reduction when compressed for electrical connection with the battery cell 10, and thus the battery pack may have a relatively low height and may be effectively used for slim devices.

According to the embodiments, the electrical connection structure for forming the charge-discharge path from the first and second electrodes 10a and 10b to the first and second output positions P1 and P2 may be simple, and thus the battery pack may have a compact structure.

According to the embodiments, it is possible to prevent (e.g., fundamentally prevent) or substantially prevent a short circuit which may occur between the first and second output positions P1 and P2 through an unintended external conductor, and thus the battery pack may have improved safety.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and equivalents thereof.

What is claimed is:

1. A battery pack comprising:
   a battery cell comprising a first surface, a first electrode on the first surface, a second electrode on the first surface, a second surface opposing the first surface, and a lateral surface connecting the first surface and the second surface to each other;
   first and second leads above the first and second electrodes, the first and second leads being respectively connected to the first and second electrodes;
   an insulating adhesive layer between the first surface and the first lead; and
   an insulating cover layer on the first and second leads, the insulating cover layer comprising an opening through which portions of the first and second leads are exposed,
   wherein the first lead overlaps an opening of the insulating adhesive layer and is connected to the first electrode through the opening of the insulating adhesive layer,
   wherein the portions of the first and second leads are exposed through the opening of the insulating cover layer at respective positions spaced along the first surface,
   wherein the first electrode is in a center area of the first surface, and
   wherein the second electrode is in a peripheral area of the first surface, the peripheral area of the first surface surrounding the first electrode.

2. The battery pack of claim 1, wherein the first and second leads are electrically connected to the first and second electrodes with first and second compressible conductors therebetween.

3. The battery pack of claim 2, wherein the first and second compressible conductors comprise an anisotropic conductive adhesive.

4. The battery pack of claim 1, wherein the first and second leads are electrically connected to the first and second electrodes by thermal bonding.

5. The battery pack of claim 1, wherein the first and second leads are exposed in a downwardly shifted manner from a top surface of the insulating cover layer.

6. The battery pack of claim 1, wherein the opening of the insulating cover layer comprises first and second openings through which the portions of the first and second leads are respectively exposed.

7. The battery pack of claim 6, wherein the first and second openings are located at opposite peripheral positions of the insulating cover layer corresponding to a peripheral area of the first surface.

8. The battery pack of claim 6, wherein the first and second leads extend between the first and second electrodes and the first and second openings.

9. The battery pack of claim 6, wherein the first and second leads comprise:
   first extension portions extending in an arrangement direction of the first and second leads; and
   second extension portions extending in a direction crossing the arrangement direction of the first and second leads,
   wherein the first extension portions intersect the second extension portions at positions at which the first and second leads are exposed through the first and second openings.

10. The battery pack of claim 9, wherein the arrangement direction of the first and second leads is a diameter direction of the first surface having a circular shape.

11. The battery pack of claim 1, wherein the first lead comprises a first end portion conductively coupled to the first electrode via a first compressible conductor in a center area of the first surface, and
   wherein the first lead comprises a second end portion insulatively coupled to the second electrode via the insulating adhesive layer in a peripheral area of the first surface.

12. The battery pack of claim 1, wherein the first and second leads are between the first surface and the insulating cover layer, and
   wherein the insulating adhesive layer is between the first surface and the first lead.

13. The battery pack of claim 1, wherein the insulating adhesive layer comprises a double-sided tape and a first insulating tape sequentially stacked on the first surface of the battery cell.

14. The battery pack of claim 13, wherein the insulating cover layer further comprises a second insulating tape, and
   wherein the first lead is adhesively fixed between the first and second insulating tapes.

15. The battery pack of claim 14, wherein the second lead is adhesively fixed between the second insulating tape and the first surface.

16. The battery pack of claim 1, wherein connection members are on the portions of the first and second leads which are exposed through the opening of the insulating cover layer.

17. The battery pack of claim 16, wherein the connection members comprise a compressible conductor, a soldering material, or wiring.

18. The battery pack of claim 17, wherein the compressible conductor comprises an elastic contact body.

19. A battery pack comprising:
a battery cell comprising a first surface, a first electrode on the first surface, a second electrode on the first surface, a second surface opposing the first surface, and a lateral surface connecting the first surface and the second surface to each other;
first and second leads above the first and second electrodes, the first and second leads being respectively connected to the first and second electrodes;
an insulating adhesive layer between the first surface and the first lead; and
an insulating cover layer on the first and second leads, the insulating cover layer comprising an opening through which portions of the first and second leads are exposed,
wherein the opening comprises first and second openings through which the portions of the first and second leads are respectively exposed,
wherein the first lead extends from a first end portion thereof located in a center area of the first surface to the first opening located in a peripheral area of the first surface, and
wherein the first lead comprises a second end portion exposed through the first opening.

20. A battery pack comprising:
a battery cell comprising a first surface, a first electrode on the first surface, a second electrode on the first surface, a second surface opposing the first surface, and a lateral surface connecting the first surface and the second surface to each other;
first and second leads above the first and second electrodes, the first and second leads being respectively connected to the first and second electrodes;
an insulating adhesive layer between the first surface and the first lead; and
an insulating cover layer on the first and second leads, the insulating cover layer comprising an opening through which portions of the first and second leads are exposed,
wherein the insulating adhesive layer exposes a center area of the first surface in which the first electrode is located, and the insulating adhesive layer is provided along a peripheral area of the first surface, the peripheral area surrounding the first electrode.

21. The battery pack of claim 20, wherein the insulating adhesive layer comprises an open side through which a portion of the peripheral area of the first surface is exposed.

22. The battery pack of claim 21, wherein the open side of the insulating adhesive layer is at a position corresponding to the second lead, the open side having a shape open in an arrangement direction of the first and second leads.

* * * * *